Dec. 27, 1927.  1,654,420
A. C. HOECKER
COMBINED CONTRACTOR AND EXPANDER FOR AUTOMOBILE TIRE RIMS
Filed May 26, 1919
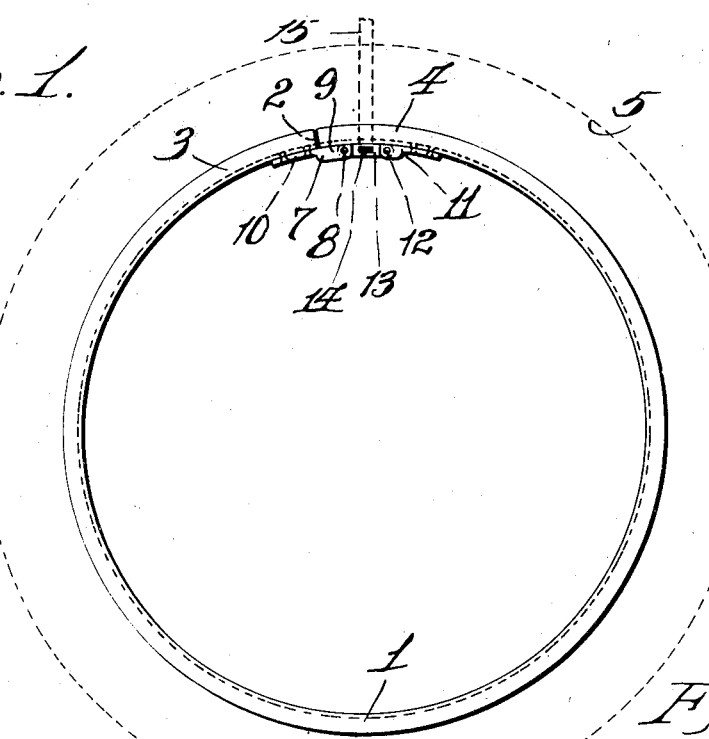
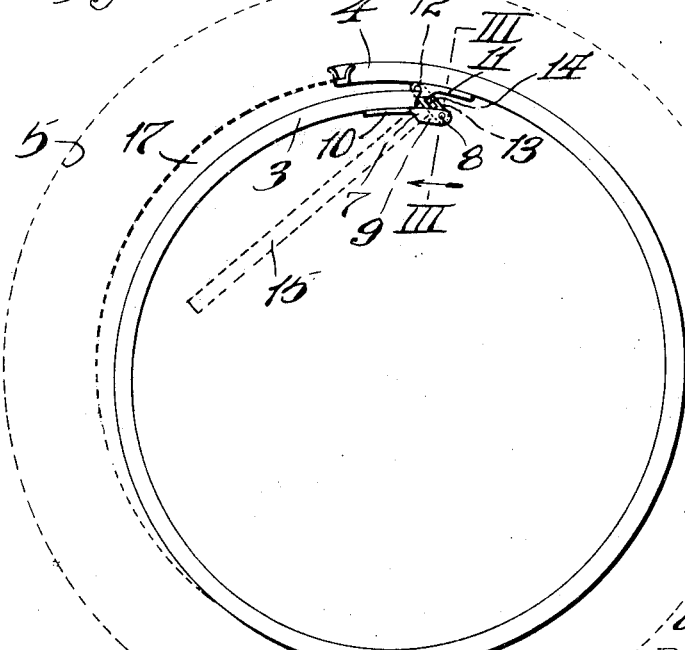
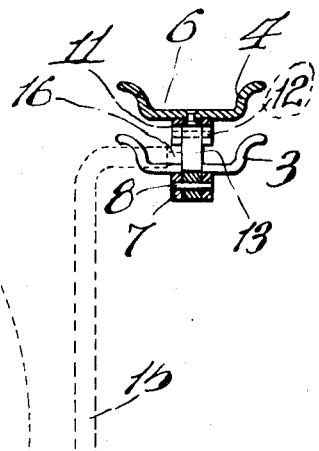
Inventor.
Albert C. Hoecker.
By A. G. Fletcher
atty Patented Dec. 27, 1927.

1,654,420

UNITED STATES PATENT OFFICE.

ALBERT C. HOECKER, OF COLLINSVILLE, ILLINOIS, ASSIGNOR, BY MESNE ASSIGNMENTS, TO AMERICAN AUTO RIM LOCK CORPORATION, A CORPORATION OF MISSOURI.

COMBINED CONTRACTOR AND EXPANDER FOR AUTOMOBILE TIRE RIMS.

Application filed May 26, 1919. Serial No. 299,763.

The primary object of this invention is to provide an improved attachment for split automobile tire rims that can be mounted on the inner periphery of the rim thereby forming a part thereof so that the diameter of the rim can be quickly contracted relative to the mounting or demounting of an automobile tire thereto.

Another object of this invention is to provide an improved contracting and expanding attachment for demountable automobile tire rims which will be attached to the under side of the rim adjacent the split thereof so that the periphery of the rim can be abnormally contracted from its normal circumference, or in other words reduce the diameter of the rim so that the tire can be readily removed therefrom.

Other and further objects will appear in the specification and be specifically pointed out in the appended claims, reference being had to the accompanying drawings exemplifying the invention, and in which, Figure 1 is a side elevation showing an automobile tire rim with a tire mounted thereon having this improved contracting and expanding attachment applied thereto, the rim being shown in its expanded or normal position relative to securing the tire thereon.

Figure 2 is a view similar to Fig. 1, but showing the effect of this improved attachment relative to contracting or reducing the diameter of the rim in connection with the tire that is to be mounted or demounted.

Figure 3 is an enlarged transverse section taken on the line III—III of Fig. 2.

Referring to the drawings, 1 designates a grooved steel tire rim which is split as indicated at 2, thereby forming adjacent ends 3 and 4 when the rim is in normal or expanded position relative to holding a pneumatic tire 5 within the groove 6 thereof.

Secured to the inner periphery of the rim 1 on the end 3 in any suitable manner is a pivot mounting 7 bearing a pivot 8, said pivot 8 being mounted in an extended portion 9 of the mounting 7 so that the pivot 8 will underlap the end 4 of the rim whereas the securing end 10 of the mounting is secured to the end 3. Secured to the inner periphery of the end 4 and at a distance from the mounting 7 is a pivot mounting 11 bearing a pivot 12, and connecting the pivots 8 and 12 of the respective mountings 7 and 11 is a connecting or draw link 13 having an aperture 14 for the introduction of a tool 15.

When a tire rim is equipped with this improved contracting and expanding device, which is comprised of the mountings 7 and 11, link 8 and the respective pivots, all of the parts are in the positions shown in Fig. 1, whereas when it is desired to remove the tire from the rim, the rim bearing the tire having been demounted from the felloe of the wheel, and this improved contracting and expanding device having been operated, the parts will be in the positions as shown in Fig. 2.

The demounting operation of removing the tire from the rim is as follows: After removing the rim bearing the tire from the wheel, the engaging end 16 of the tool 15 is inserted in the rectangular shaped aperture 14 of the link 13, in which the handle of the tool will be vertically arranged as shown by dotted lines in Fig. 1. Downward pressure is then brought to bear on the handle of the tool so that the handle will be brought to the approximate position as shown in Fig. 2, which operation causes the link 13 to swing from the pivot 12 of the mounting 11 while the opposite end of the link which engages the pivot 8 of the mounting 7 is forced downward, thereby causing the end 3 of the rim 1 to be depressed, and as the link 8 is moved towards a vertically alining position relative to the pivot 12, the end 3 of the rim is caused to underlap the end 4 thereof. When the pivot 8 is moved across the vertical center to the position shown in Fig. 2, a lock is formed between the link 13 and the ends 3 and 4 to which the link is related so that the ends 3 and 4 will retain their overlapping positions, and in consequence therewith, the outer periphery or tire engaging part of the rim is contracted, providing a recess 17 between the tire and the rim, thereby providing a looseness in which the tire can be readily removed from the rim or vice versa.

It is obvious from the aforementioned operation that a tire can be easily mounted on a rim in this contracted position on account of the normal size of the rim being decreased.

What I claim is:

1. A tire rim having a transverse split, a pivotal mounting secured to the inner periphery of said rim on each side of the split thereof each bearing a pivot, one of said mountings having an extending portion in which the pivot thereof extends beyond the rim split, and a relatively flat link connecting the pivots of said mountings having an opening formed therein in circumferential alinement with said pivots for the introduction of an operating tool.

2. A tire rim having a transverse split so as to provide ends thereto which are adapted to overlap, and drawing means comprising a link permanently pivoted to the respective ends of said rim, said link being provided with a transversely extending polygonal opening adapted for the reception of an operating tool.

ALBERT C. HOECKER.